Aug. 25, 1953 — R. L. EWALD ET AL — 2,649,879
MECHANISM FOR PEELING THE STEM INDENTS OF FRUIT
Original Filed Oct. 31, 1940 — 8 Sheets-Sheet 3
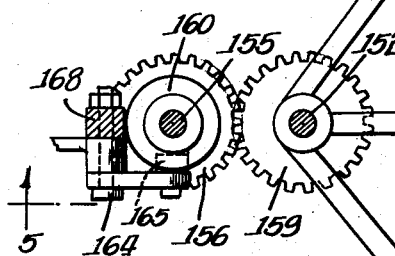
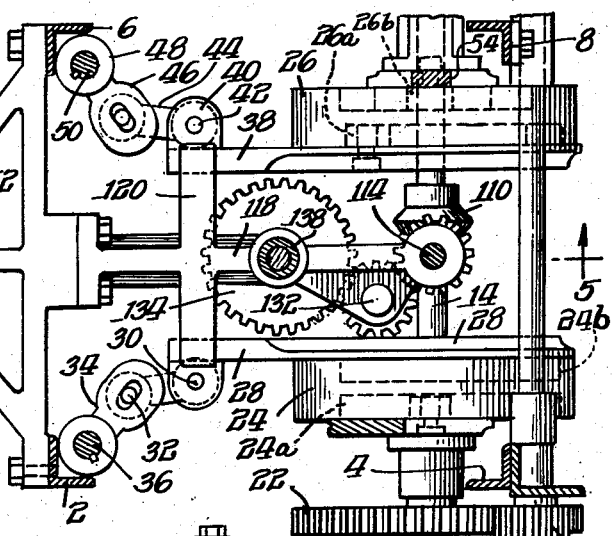
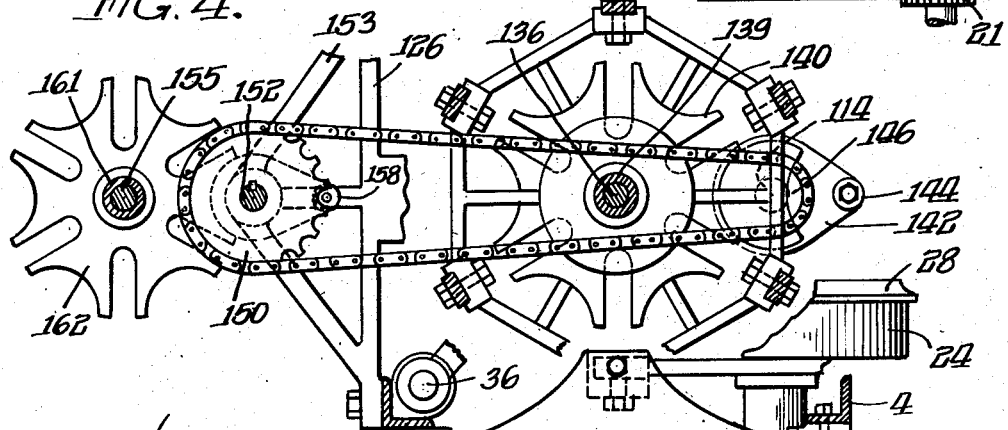
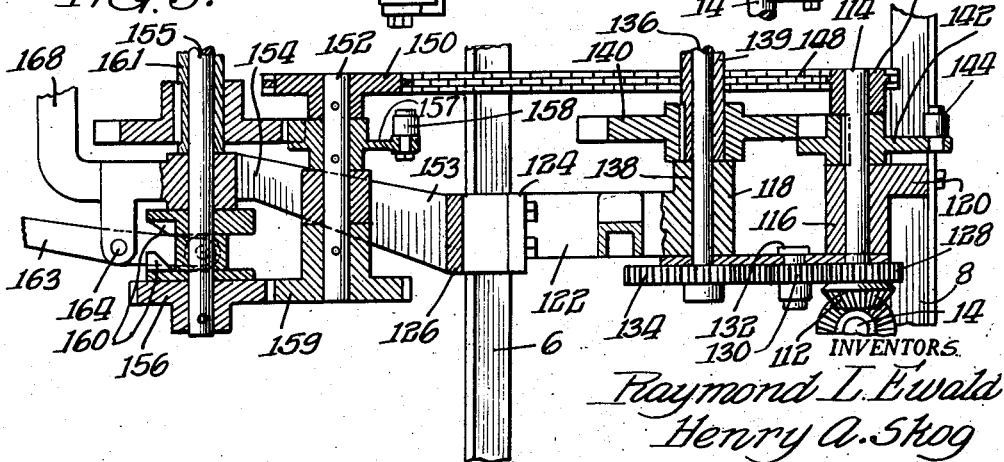
INVENTORS.
Raymond L. Ewald
Henry A. Shog
By: Loftus, Moore, Olson & Trexler
Attys

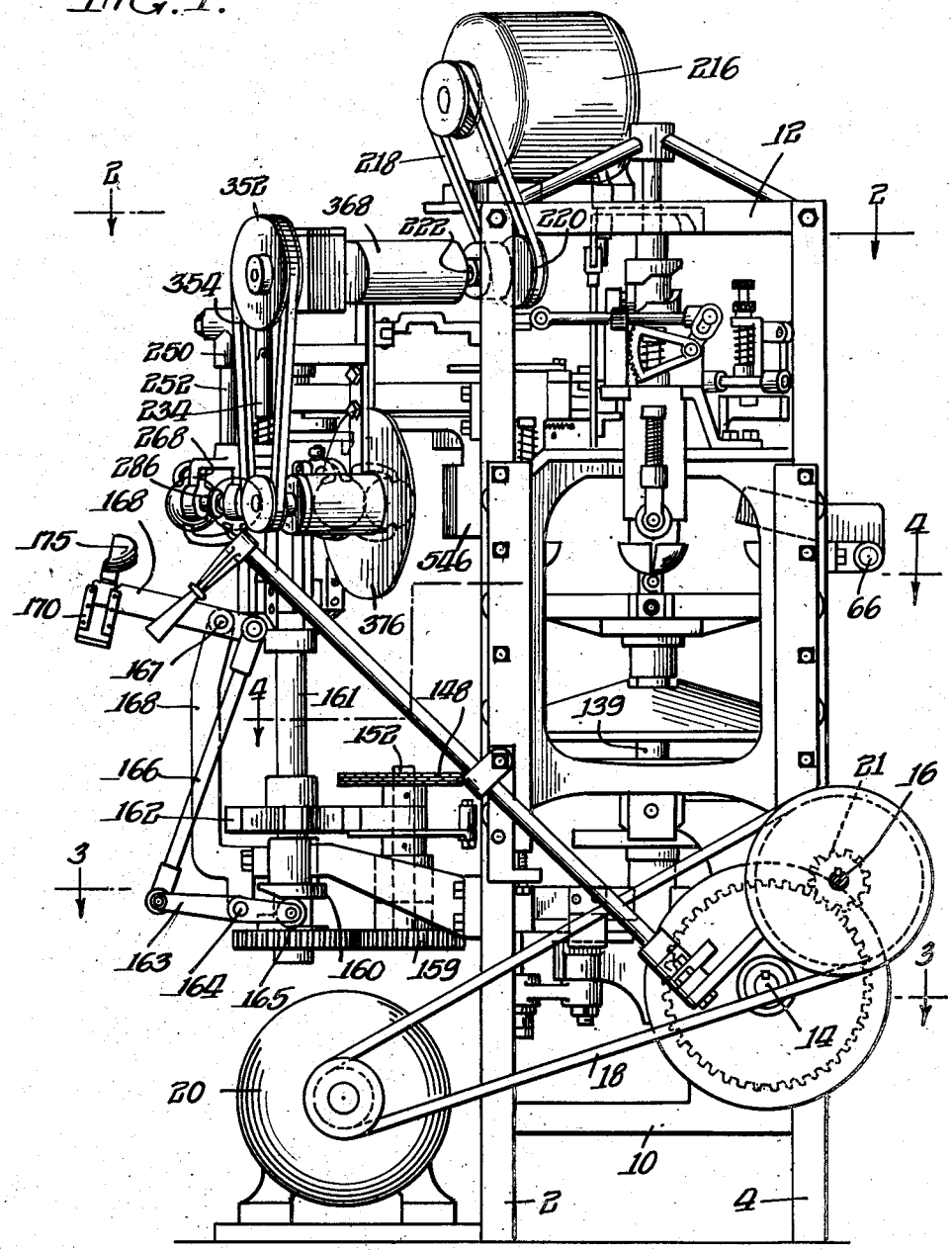

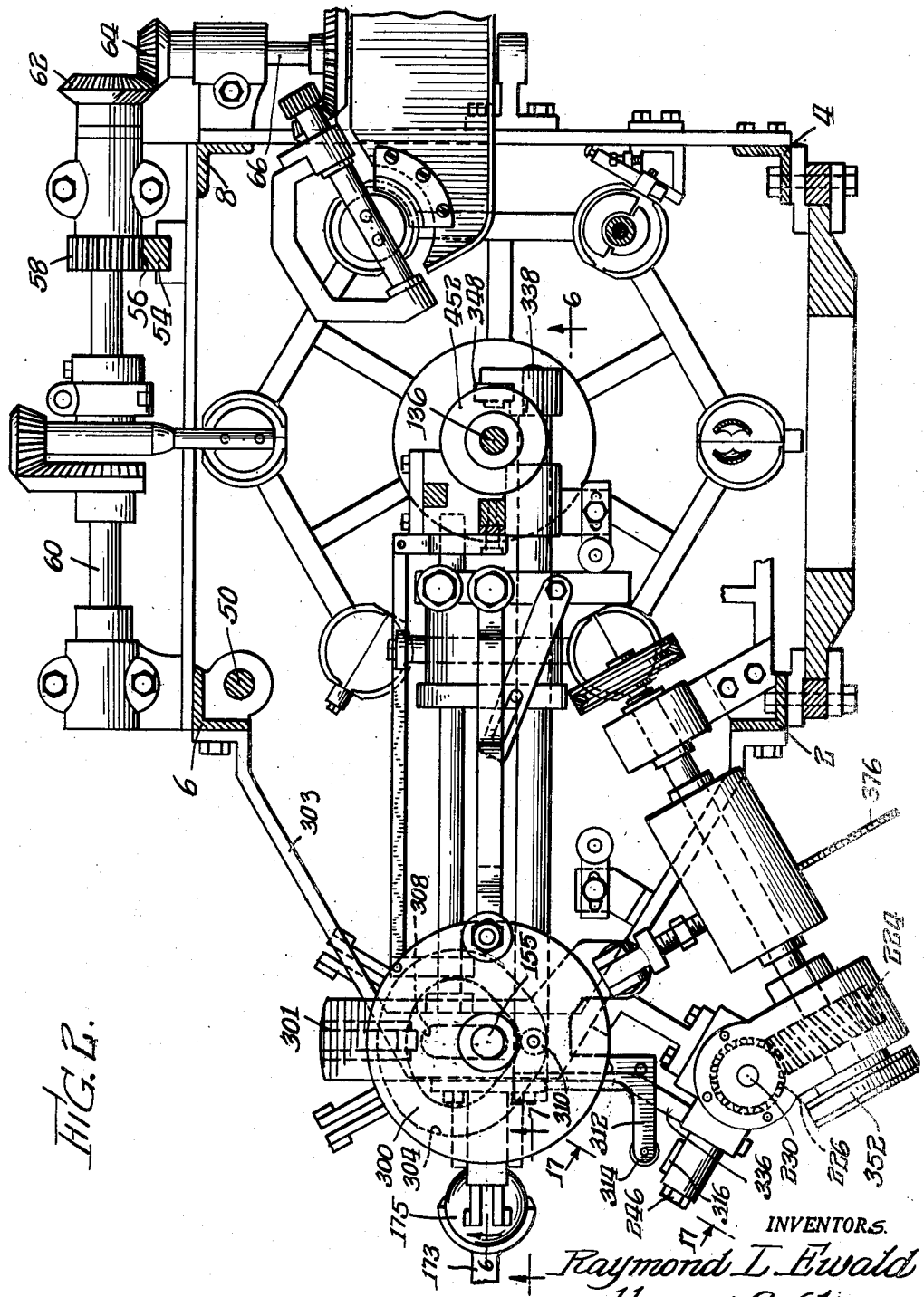

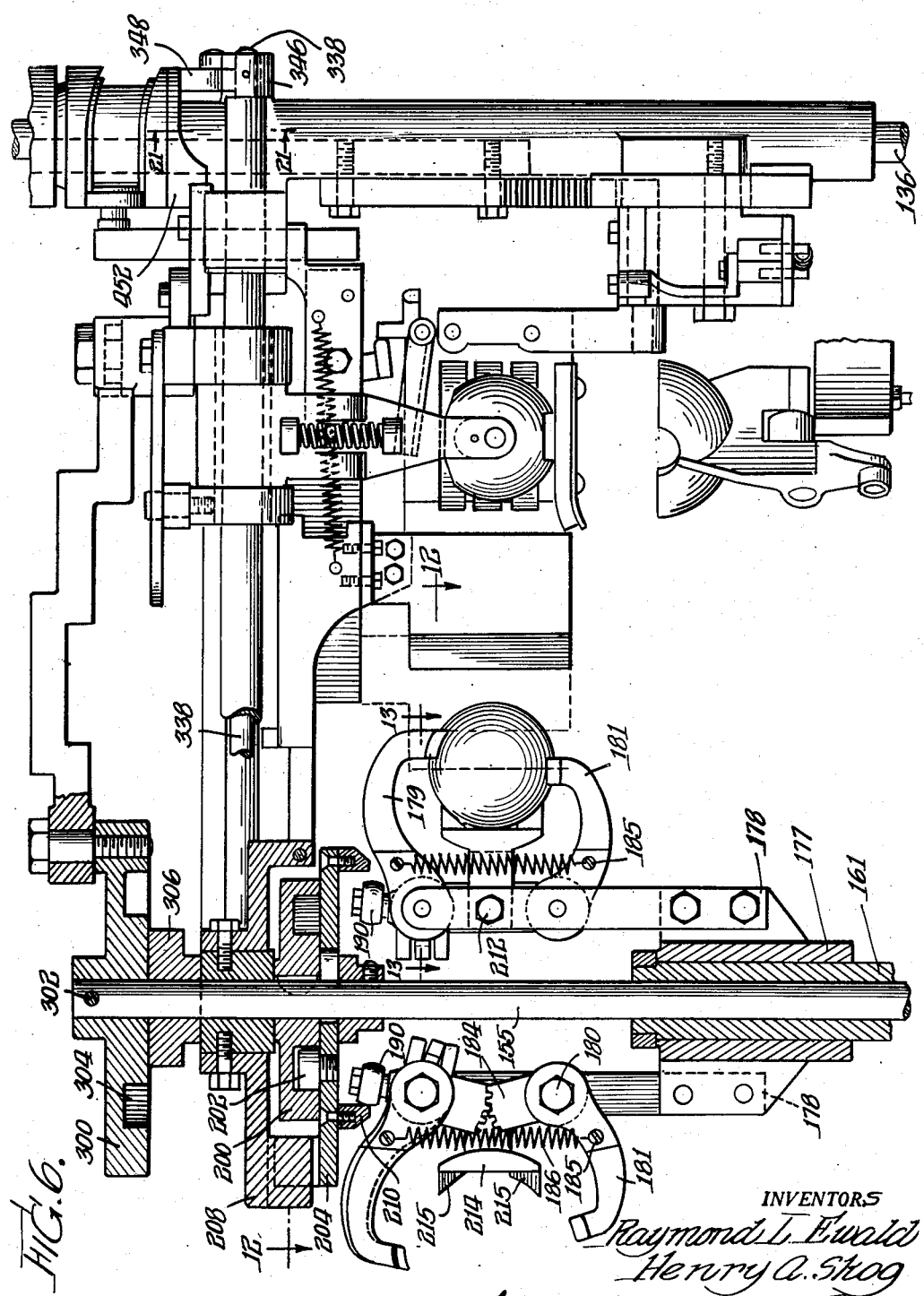

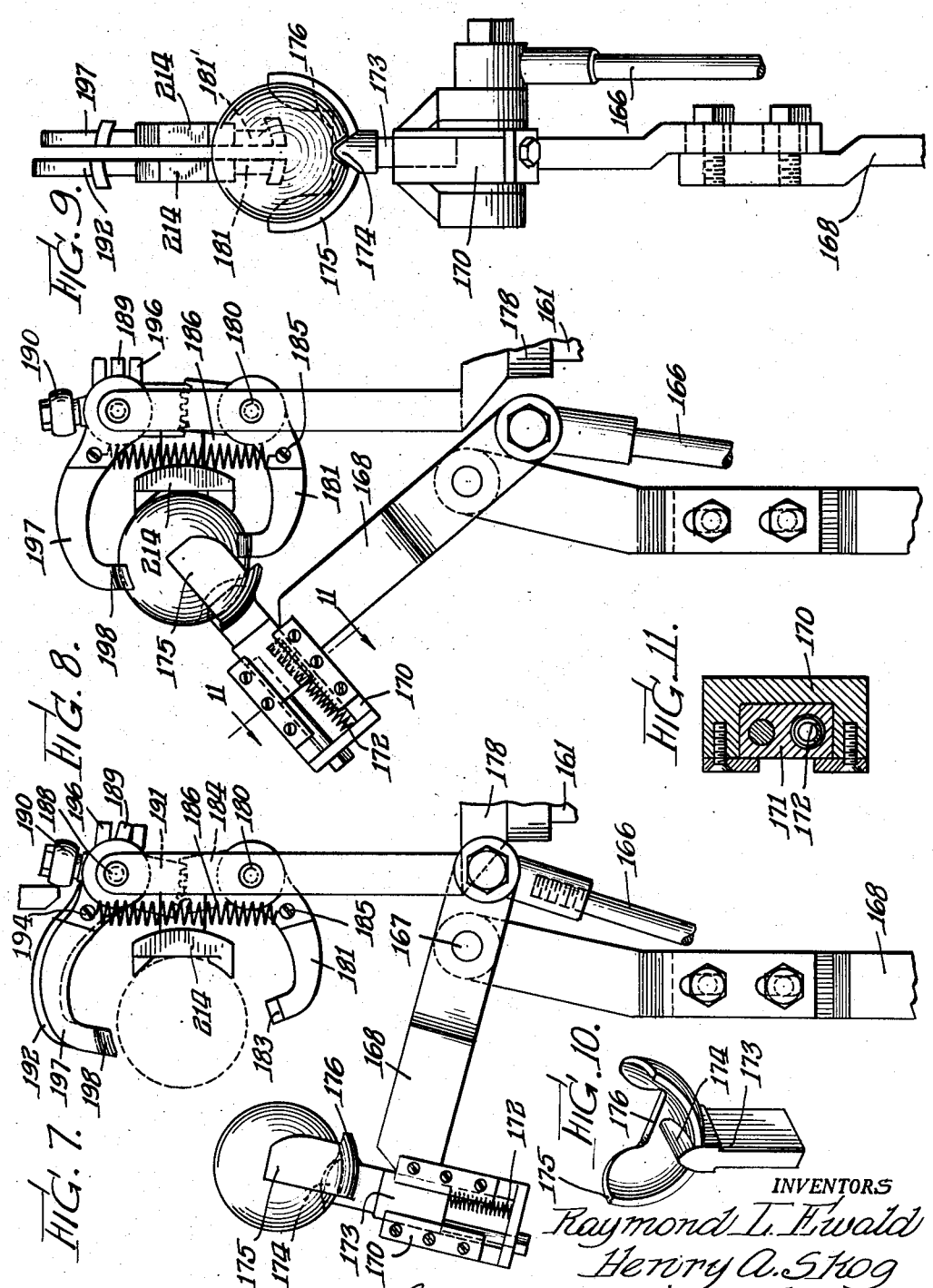

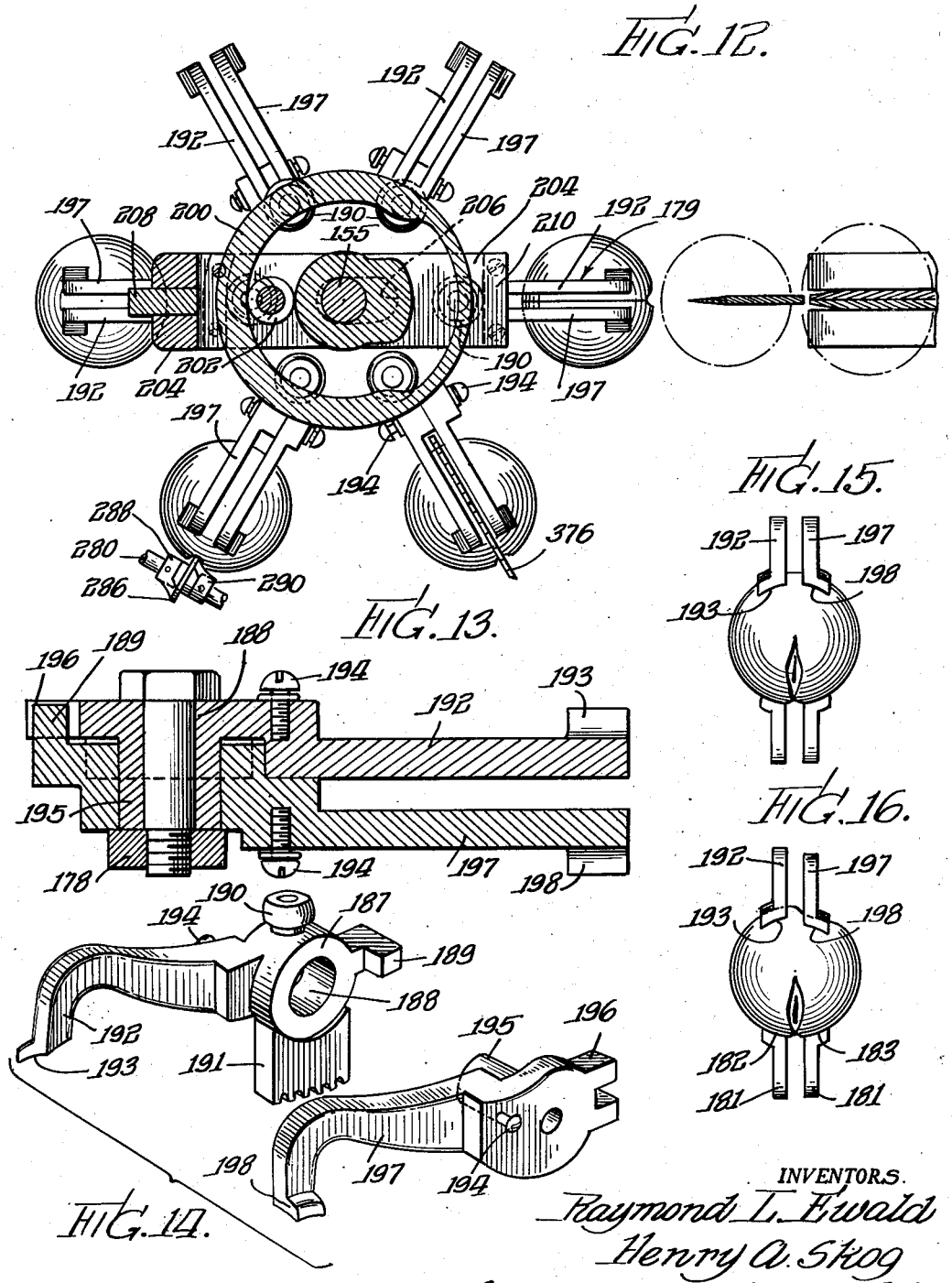

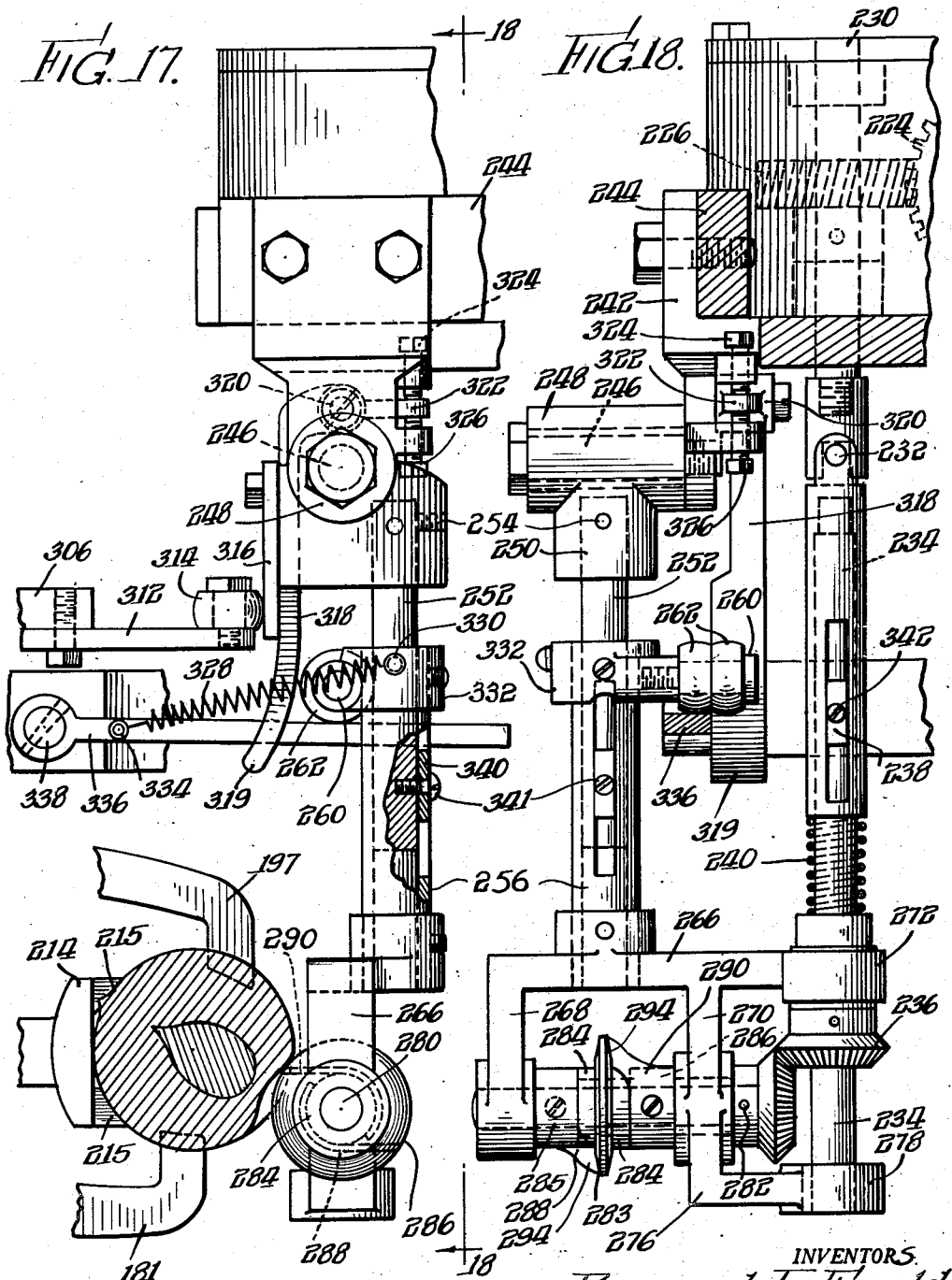

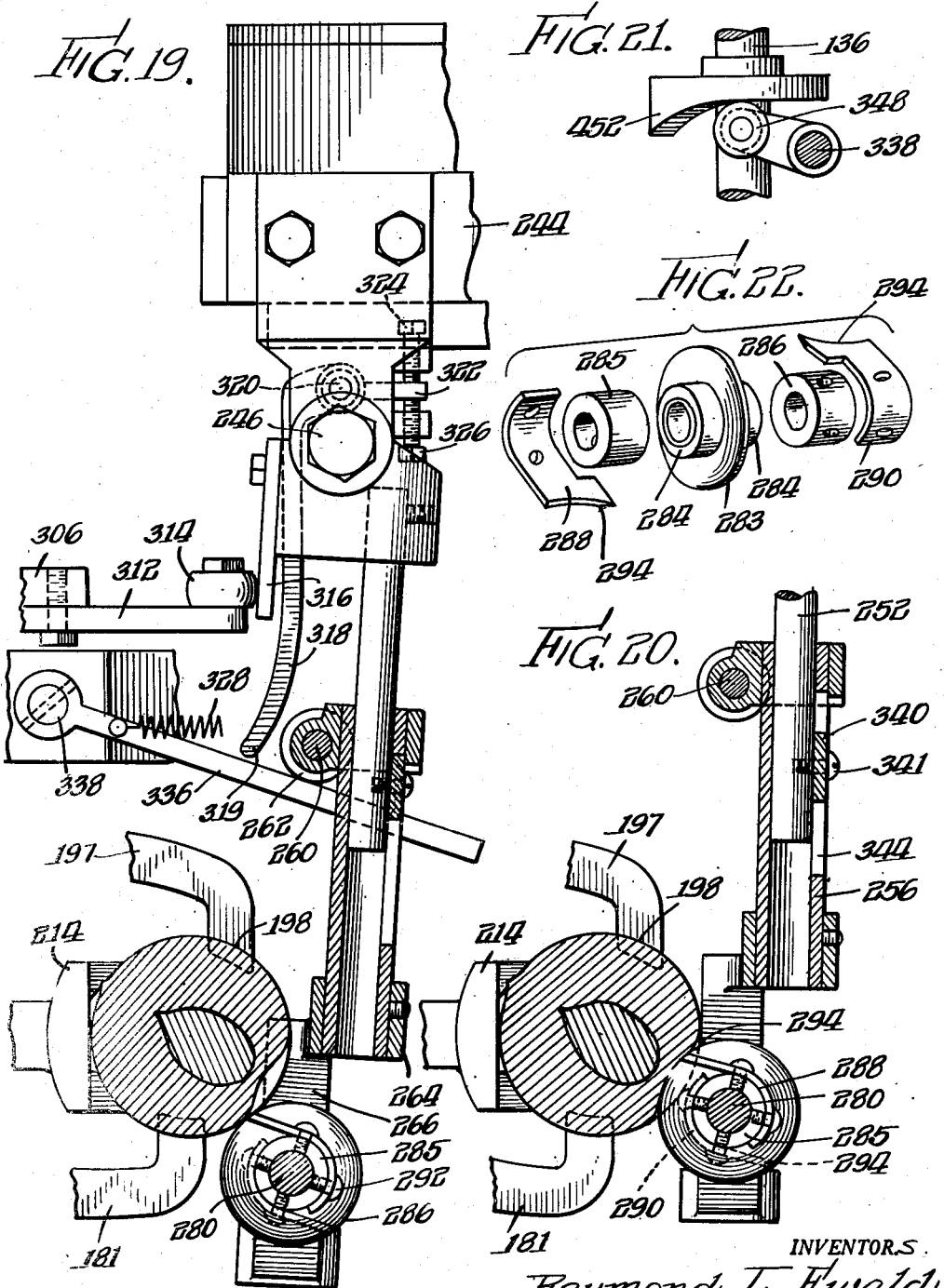

Patented Aug. 25, 1953

2,649,879

UNITED STATES PATENT OFFICE 2,649,879

MECHANISM FOR PEELING THE STEM INDENTS OF FRUIT

Raymond L. Ewald and Henry A. Skog, Olympia, Wash., assignors to Special Equipment Company, Portland, Oreg., a corporation of Oregon Continuation of application Serial No. 472,322, January 14, 1943, which is a division of application Serial No. 363,596, October 31, 1940. This application December 7, 1948, Serial No. 64,053

12 Claims. (Cl. 146—44)

This invention relates to an apparatus for processing fruit, and particularly whole peaches.

The present application is a continuation of our application Serial No. 472,322, filed January 14, 1943, and now abandoned, which latter application is in turn a division of our application Serial No. 363,596, filed October 31, 1940, and issued as Patent No. 2,398,780 of April 23, 1946.

The claims of the present application relate to the means for cutting or processing the peach in reference to the stem cavity and the suture plane thereof, and also to means for effecting the orientation of the peach in reference to its stem indent and suture plane, and also to processing means operatively or resultingly controlled therethereby.

The claims also relate to means controlled by the formation of the stem cavity for in turn controlling a cutting action on the peach, and particularly the peeling of the stem cavity.

Among the objects of the present invention are to effect the processing of fruit, and particularly peaches, automatically and in predetermined reference in respect to the peach stem indent and suture plane; to effect the orientation of the peach in reference to the stem indent and suture plane thereof to control a processing operation or as an incident to such other function of indication or control as may be desired; and to effect the rejection or inhibition of a processing operation or other machine function in connection with and resulting from a peach stem indent and suture plane orientation.

Further and more specifically stated objects of the invention, in reference to the particular stem indent peeling operation herein disclosed, are to provide means for removing the peeling at the stem cavity of the peach; to provide means cooperative with the stem cavity peeling means which provides a gauge operable during the cutting operation to remove exactly the correct amount of peel from the stem cavity and no more; to provide automatic means operable without the intervention of human hands or other human agency completely to remove the peeling from the elongated stem cavity of the whole peach, or in fact any other type of fruit having the stem cavity of a shape adaptable to the present mechanism; to provide means for removing the peeling at the stem cavity of a peach or similar fruit which prevents the cutting means from needlessly sawing or cutting the fruit at the stem cavity; to provide cutting means adapted to roll in the central portion of the elongated peach cavity whereby the cutters as they rotate will completely and precisely cut and sever the peel from the stem cavity; to provide cutting means mounted to be positioned to rotate and to partake of a swinging movement resiliently inwardly toward the stem cavity of the peach; and to provide means for giving the peel cutter for the stem cavity a combination of movements, and likewise to gauge these movements with respect to the shape of the stem cavity whereby to allow the cutters to do the peeling regardless of the length or depth of the stem cavity and in conformation with the shape of the stem cavity.

A still further object of the invention is to provide an orienting member in the form of a rotatable wheel adapted to roll relatively to the peripheral surface of the peach and yieldingly into the stem indent thereof when in alignment therewith, and substantially sufficiently into said stem indent only when aligned with the indent suture plane and the suture plane of the peach; said wheel having a peripheral surface of a curvature substantially conforming to the longitudinal curvature of the peach stem indent, and being relatively thin transversely to enter the stem indent longitudinally of the suture plane to a substantially maximum extent; said orienting member preferably forming a part of control means for the processing mechanism of the machine, for effecting the proper operation thereof in respect to the peach stem indent and suture plane.

These and other objects of the invention will be apparent from a perusal of the following specification when taken in connection with the accompanying drawings, wherein:

Figure 1 is a view of the machine as seen from the infeeding and pitting stations.

Figure 2 is a plan section taken on the line 2—2 of Figure 1.

Figure 3 is a section taken on the line 3—3 of Figure 1.

Figure 4 is a section taken on the line 4—4 of Figure 1.

Figure 5 is a section taken on the line 5—5 of Figure 3.

Figure 6 is a section taken on the line 6—6 of Figure 2.

Figure 7 is a section taken on the line 7—7 of Figure 2.

Figure 8 is a view similar to Figure 7, but showing the feeding mechanism in a subsequent position.

Figure 9 is a front view of the mechanism shown in Figure 8.

Figure 10 is a perspective view of the whole fruit cup.

Figure 11 is a detail sectional view taken on the line 11—11 of Figure 8.

Figure 12 is a sectional view taken through the line 12—12 of Figure 6.

Figure 13 is a section taken on the line 13—13 of Figure 6.

Figure 14 shows perspective views of the peach holding members.

Figures 15 and 16 are front views of the same fruit holding jaws.

Figure 17 is a section taken on the line 17—17 of Figure 2.

Figure 18 is a section taken on the line 18—18 of Figure 17.

Figure 19 is a changed position of the parts shown in Figure 17.

Figure 20 is a changed position of the parts shown in Figure 19.

Figure 21 is a section taken on the line 21—21 of Figure 6.

Figure 22 shows detailed perspective views of the cavity stem peeling cutters and guides.

The invention of the present construction preferably takes the form of an upright, substantially square main frame comprising four corner posts or angle irons 2, 4, 6, and 8 (see Figures 1, 3, and 4), suitably braced at top and bottom by cross-braces 10 and 12. In addition, other hereinafter described cross bars serve as rigid supports for these upright members. In a general way, extending laterally from this rectangular frame projects a supplementary frame adapted to be bolted or otherwise attached thereto, as shown in Figures 1 to 4, inclusive, which suplementary frame is utilized to support the mechanism which initially receives the fruit, the mechanism which orients the fruit and severs the peeling at the stem cavity of the fruit, which severs the fruit in halves and which transports the severed halves to the pitting, peeling, fruit-discharging and peel-scavenging mechanism.

The main upright frame hereinbefore described is provided on a relatively low level thereof with horizontally disposed shafts 14 and 16, the latter being power driven through a clutch mechanism (see Figure 3) by means of a belt 18, adapted, in turn, to be driven from any suitable motor 20. The clutch mechanism is of any desirable construction capable of connecting and disconnecting the power source to the main operating shaft of the machine.

The shaft 16 carries a gear 21, driving another gear 22 on the horizontal shaft 14. This shaft 14 carries two main cams 24 and 26 fixed on opposite ends thereof. Each of these cams are double-faced so as to provide cam operating means on each side thereof. Cam face 24a comprises a cam track in which operates a hereinafter described roller on a vertically reciprocable slide for raising and lowering the main tool carrying slide hereinafter described. An opposed cam face forms a roller race, in which a roller on a horizontally reciprocable slide 28 shifts in a horizontal motion transversely to the shaft 14. This slide carries on its outer end a bearing pivot 30 linked to a bearing pivot 32 on an arm 34 fixed on a vertical shaft 36. This shaft has fixed bearings in the housing frame 2 of the main upright frame of the machine. Vertical shaft 36 is oscillated by the slide 28 for operating the peeling mechanism.

The cam 26 of the shaft 14 has a cam face 26a forming a cam race, which operates a roller, connected to and operating a horizontally reciprocable slide 38, as shown in Figure 3. This slide 38 is also provided on its outer end with bearing 40 having a vertical pin 42, to the lower end of which is pivoted a link 44. This link 44 carries at its outer end an arm 46, the outer bearing 48 of which is pinned to a vertical oscillatable shaft 50, which is mounted in the corner post 6 of the frame opposite the vertical shaft 36. This shaft 50 has affixed to its upper end an arm hereinafter referred to, which, in turn, pivotally connects at its outer end to a relatively long rod running diagonally across to a universal connection which is, in turn, connected to a mechanism that operates a sector gear reciprocable about a horizontal axis for operating the mechanism which actuates the pitting knives.

Cam race 26b operates a vertically reciprocable slide 52 (see Figures 2 and 3), the upper end of which is provided with a rod 54 having a rack tooth portion 56 operating a pinion 58 on a horizontal shaft 60. This shaft 60 has on one end a bevel gear 62 which, in turn, operates bevel gear 64 on shaft 66 having bearings on the outside of the vertical frame member and on the same level as the main fruit cup turret hereinafter described, which turret is above that lower level of the machine at which the shafts 14 and 16 are located. The shaft 66 operates the mechanism for positioning the auxiliary fruit holding means, specifically the pad over the fruit cup, for holding the half fruit from tilting during peeling and also for oscillating the fruit discharging means, ejecting the processed half fruit from the machine.

A second level of the main rectangular frame of the machine bounded by the uprights 2 to 8, inclusive, provides the location for the Geneva gears for driving the main or half fruit-holding turret, and also the whole fruit turret, including the driving means therebetween, whereby the main or half fruit holder turret is driven at twice the speed as the whole fruit turret. To effect this function, the shaft 14 carries between its ends a bevel gear 110 (see Figure 3) meshing with a bevel gear 112 on a vertical shaft 114 mounted in the bearing 116 carried by a cross frame 118. This cross frame is supported at one end by suitable vertical brace connected to a cross bar 120 (see Figure 5), in turn carried by the vertical upright frame members 4 and 8. The opposite end 122 of cross frame 118 is bolted to an end support by a projection 124 from a horizontal cross bar 126 carried by the opposite vertical uprights 2 and 6 of the main frame at about the level of the cross frame 118. This cross bar 126 is preferably an integral part of the substantial triangularly shaped supplementary frame carrying the whole fruit turret.

Shaft 114 carries a bevel gear 112 and also carries above it a gear 128, which latter meshes with a second gear 130 on a bearing 132 on the cross frame 118. Gear 130 meshes with the larger gear 134 horizontally fixed on vertical shaft 136 having a bearing in cross frame 118. Turret shaft 136 is surrounded by a bearing 138, above which is a long sleeve 139, along which is fixed a Geneva gear 140 having slots cooperating with a Geneva member 142 on shaft 114. This latter Geneva member 142 has a circular periphery on which is mounted roller 144 for cooperation with the radial slots of gear 140 aforesaid for intermittently rotating sleeve 139 and for holding it stationary between partial turns. The upright shaft 114 above the Geneva member carries a sprocket gear 146 (see Figure 5) driving a chain 148 running horizontally across the frame of the machine to a larger sprocket 150 fixed to shaft 152. This shaft is mounted upon a substantially triangular frame 153 carried by and integral with the cross bar 126. The frame 153 carries a bearing for the shaft 152, and also has a heavy extension bearing 154 for the whole fruit turret shaft 155. Both of these shafts are vertical and parallel to each other. The whole fruit turret shaft 155 extends vertically upward toward the top of the frame. The shaft 152 has pinned thereto just above the bearing 153 a part of the Geneva, this part carrying the roller 158.

In addition, the shaft 152 has pinned below the support 154 a gear wheel 159 which meshes with another gear 156, which is pinned to the bottom of the shaft 155. Just above the gear 156, cam 160 is pinned to shaft 155, and above the bearing 154 the shaft 155 carries a relatively long sleeve 161 to which is keyed the cooperative part 162 of the Geneva, whereby, through the intermediary of the Geneva 162, the sleeve 161 is intermittently rotated. Sleeve 161 carries the whole fruit feed turret.

*Whole fruit feed station*

Initial orienting means is provided for the fruit whereby an operator may feed whole peaches one at a time to the whole fruit holding mechanism carried by the whole fruit turret, and such mechanism comprises orienting means and automatically shiftable means preferably including a concave receiver, into which a whole peach is placed by the operator, so that the stem indent and suture plane of the half fruit is precisely and definitely located with respect to this receiver, whereby upon the shiftable operation of this feeding mechanism or receiver, the whole peach is automatically conveyed to whole peach gripping means preferably in the form of spaced fingers or jaws which are adapted automatically to grip the whole fruit adjacent and on substantially opposite sides of the suture plane of the whole fruit, and thereafter firmly to hold the whole fruit in the precise position in which it was placed in the first mentioned whole fruit receiving means. Thereafter this whole fruit gripping means is turned by the turret mechanism carrying it to a plurality of stations provided with mechanism for operating upon the peach while thus precisely held.

Direct positioning and orientation of the whole peach in the machine and the maintenance of control of a certain alignment with respect to the suture plane and stem cavity is very important for efficient results obtained from successive processing operations on the peach while it is fed through the machine. It is undesirable to provide feeding mechanism which gives the operator any particular leeway in properly placing the peach in the feeding jaws of the whole fruit turret, and therefore the hereinbefore described means is provided for eliminating all chance and guesswork by the provision of means whereby the operator merely places the stem cavity of the whole peach over a locating means, and in the construction of the whole fruit receiver with concaved walls, whereby the rounded body of the peach automatically aligns its suture, so that subsequent operations may be exactly determined.

To this end therefore mechanism for feeding a whole peach to the fruit holding mechanism of the whole fruit turret is illustrated as an arm 163 pivoted as at 164, and provided with a roller 165 which works in the cam slide of the cam 160. The outer end of the arm 163 has pivoted thereto an elongated arm 166, the upper end of which is pivoted as at 167, to a bracket 168 carried by the extension frame. This bracket, as shown in Figures 1, 8, and 9, is made adjustable, and is provided with a right angle arm 168 carrying on its outer end a guideway 170. The guideway 170 is disclosed more in detail in Figures 7, 8, and 11, and is arranged so that a block 171 is slidable therein, being normally and resiliently pushed to upward position by means of a spring 172. The outer end of the slide carries the whole fruit receiver or cradle 173 shown in detail in Figure 10. This receiver includes a substantially centrally located stem cavity positioning or orienting means 174, which is elongated as shown, and is designed to fit within the stem cavity of the whole peach and align with the longitudinal or suture plane axis thereof.

In addition, on opposite sides thereof, the cradle is provided with concaved or rounded walls 175 which are substantially cup-shaped. These walls at the rear are cut away as shown at 176, so as not to interfere with the opening and closing movements of the lower whole fruit holding fingers or jaws, as shown in Figure 8. It will be noted that the angle arm 168 is arranged so that, when in position to place the half fruit between the holding jaws hereinafter referred to, the stem axis of the whole peach is angularly disposed with respect to a horizontal line passing through the center of the whole fruit receiving means. Specifically the stem axis is downwardly inclined about 30 degrees to such line. This is particularly important because, as the whole fruit is carried by the gripping means of the whole fruit turret, it must be maintained in this exact position.

The spring 172, by reason of its resiliency, permits some latitude in the positioning of the whole fruit with respect to the stationary support of the whole fruit receiving jaws, as hereinafter set forth, so as to accommodate fruits or peaches of different sizes.

Referring now to the turret proper and to the fruit holding jaws, it will be observed that the intermittently rotatable sleeve 161 carries an additional sleeve 177 and affixed thereto are a plurality of post supports 178, such supports being radially spaced around the central vertical axis of the turret. Each one of these supports 178, in turn, is provided with an upright extension upon which the whole fruit holding jaws are mounted. By reference to Figures 6 to 16, inclusive, the construction and operation of these jaws will be apparent. The lower jaw 181 is pivoted as at 180 to the upright 178. This lower jaw is formed with two integral spaced apart jaws or fruit gripping fingers 181, which have concaved portions 182 and 183 adapted to engage the curvilinear contour of the whole peach on opposite sides of a plane passing substantially vertically through the plane of the suture, as shown in Figures 15 and 16.

In addition, this lower jaw 181 is provided at its rear end with an angularly disposed tooth projection 184, and is provided with a connection 185 with a coil spring 186 as hereinafter set forth. The upper jaw is made in two pieces, whereas the lower jaw is preferably made in a single piece. The details of construction of the upper jaw are shown in Figures 13 and 14. This upper jaw comprises a head portion 187 centrally apertured as at 188. The head is provided with a lateral lug 189 hereinafter referred to, and with an operating roller 190 on its upper portion, and a laterally extending tooth arm 191, the teeth of which mesh with the teeth of the arm of the lower clamping jaw of the whole fruit holding mechanism. In addition, the head portion 187 is provided with a laterally extending fruit clamping jaw 192 having a curvilinear fruit contacting face 193 for engaging the contour of the peach on one side of the plane of the suture. In addition, this jaw is provided with an upstanding lug 194, to which the upper ends of the spring 186 connect. The cooperative part of the upper jaw is formed with a round bearing 195, which easily fits within the opening 188 of the head 187 to permit relative angular movement between the parts. This head is provided with a furcation in the form of a rearwardly extending lug 196, which is adapted to receive the lug 189 therebetween that is formed on the cooperative portion of the first portion of the upper gripping jaws. In addition, this part of the jaw is provided with a forwardly extending gripping portion 197, which is arcuately curved as at 198 to grip the contour of the peach on the opposite sides of the suture planes, as shown in Figures 15 and 16. The furcation 196 and the cooperating lug 189 provide a lost motion connection, which permits two portions of this upper jaw to have vertical adjustment, as shown in Figures 15 and 16, whereby in the event a peach is held, which is of smaller diameter on one side of the suture plane than the other, the upper gripping jaw will adjust itself accordingly, whereby to hold the peach precisely as it is inserted between these jaws when they move together under the tension of the closing springs 186. There are a pair of springs for each jaw—one on each side of the vertical plane through the central portion of these jaws—the upper ends being attached to the pins 194 and 194', respectively, and the lower ends of the springs being attached to the pins 185 and 185' of the lower jaws. It will be noted that the holding portions 181, 181' of the lower jaws and the portions 192, 197 of the upper jaws are spaced apart to permit the entry of the saw 376 therebetween in the subsequent cutting operation of the peach through its suture plane, so that the saw may completely sever the entire peach and its pit while held in these jaws. It will be further noted that this space between these fingers 181, 181' and 192 and 197 lies in the suture plane of the peach, which is approximately the plane of the maximum diameter of the peach, or parallel thereto.

Means for operating the jaw mechanism of the whole fruit holding means comprises a cam 200 which is splined to the upper end of the shaft 155. This cam is provided with an internal camway adapted to receive a roller 202 mounted upon a slide 204 disposed immediately beneath the cam and lying transversely across the shaft 155. The slide is suitably slotted as at 206 (see Figures 6 and 12) to permit movement of the slide back and forth transversely across the axis of the shaft 155. The slot is adapted to move in guideways 208 fixed to the extension support of the machine. The bottom portion of the slide is provided with two depending lugs forming extensions thereon. These lugs are 180 degrees apart. The cam race 202 of cam 200 extends 360 degrees of a total annular travel of the cam. When the slide 204 is moved toward the feed-in station, i. e., away from the main or half fruit turret, the depending lug nearest the main turret moves toward the feed-in station, and thereby pushes the roller 190 on the top of the upper finger of the corresponding whole fruit jaws inwardly toward the shaft 155, thereby positively to open these fruit jaws. Simultaneously, the opposite lug 210, which is spaced 180 degrees therefrom, moves in the same direction to permit the spring 186 to close the oppositely located fruit clamping jaws about or into engagement with a peach positioned by the fruit receiving saddle 175, and thereby hold the whole fruit firmly between the fingers of the jaws. Any variations in size of successive peaches are automatically compensated for by the yielding action of the springs 186 between the upper and lower clamping jaws, and any deviations in size on opposite sides of the plane of the suture of the peach are compensated for by the relative movement between the members of the upper fruit jaw.

The upright 178 on turret 177 has rigidly bolted thereto as at 212 a laterally projecting backing member 214, which is shaped as shown in Figure 8 thereby to position and firmly to hold the rear portion of the peach positioned between the clamping jaws by the whole fruit receiver 175.

By reason of the foregoing construction, the whole fruit turret is intermittently rotated to position each pair of fruit holding jaws at the receiving station, during which time the jaws are automatically held in open position while a whole peach is fed onto the peach-receiving cradle 175 in a manner hereinafter set forth, and thereafter the receiver 175 is moved upwardly to position the peach, as shown in Figure 8, during which time the upper and lower jaws of the clamping members are cam released so as to resiliently approach the peach to grasp and hold it firmly and precisely in the before described predetermined position.

At the same time that the turret is moved, the shaft 155 is synchronously driven to operate automatically the cam and slide hereinbefore mentioned to cause these proper opening and closing movements of these jaws in timed relation.

Further referring to the foregoing mechanism, once the whole peach is placed manually with the long or suture plane axis of its stem cavity registering with and oriented by the positioning nib or orienting or gauge means 174 of the fruit cradle, as illustrated in Figure 9, the whole peach will thereafter be raised upwardly to the position shown in Figure 8, with the stem axis downwardly inclined from the horizontal, as therein shown, and with the suture plane in predetermined position. At this time the whole fruit jaws firmly grasp the fruit as hereinbefore set forth, whereupon the fruit-receiving cradle moves downwardly, the turret then automatically shifts to the stem cavity trimming station; and at the same time an empty set of whole fruit holding jaws is brought into registration ready for the next upward movement of the whole fruit receiving cradle.

*Indenture and suture plane orienting means, and peach cutting means controlled thereby*

In addition to the peach orienting mechanism hereinbefore described, due to variations in the sizes and shapes of peaches, and other factors of variation, in accordance with the present invention additional peach stem indent and suture plane orienting mechanism, specifically in the form of sensing, gauging, and control means, is provided, as will now be described, such last named orienting mechanism forming a part of control means for controlling the operation of peach processing mechanism, specifically a cutting means, upon the peach in predetermined reference to the peach stem indent and suture plane.

This latter orienting mechanism, as specifically herein disclosed, comprises a rotatable wheel adapted to have movement relatively to a whole peach and to roll relatively along the peripheral convex surface of the whole peach and then move yieldably into the long axis of the stem indenture when the long axis or suture plane axis of the stem indenture registers with the plane of rotation of the wheel.

The entering movement of the wheel forms a part of control means for controlling the operative functioning of peach cutting means, and more specifically inhibits the effective operation thereof when proper entry is not made, the orienting member thus additionally serving as a rejecting or inhibiting mechanism for precluding the effective operation of the cutting means upon the peach when the peach, in reference to its stem indent and suture plane, is not properly positioned. The orienting wheel is of sufficiently large diameter with regard to the dimensions of the longitudinal or suture plane axis of the stem indent whereby when relative motion is produced between the rotatable wheel and the whole peach, and the wheel comes in contact with the convex curvature of the whole peach and then subsequently comes into registration with the stem indent of the whole peach, the wheel due to its said radius of curvature will enter radially into the stem indent to a maximum depth when the wheel registers with the longitudinal or suture plane axis of the stem indent, but not otherwise. When the wheel orienting member fails to enter the stem indent, or enters the stem indent in a position angularly disposed in respect to the suture plane, the operative functioning of the processing mechanism of the machine, specifically a cutting means as herein disclosed, is varied and appropriately controlled.

Referring specifically to the mechanism herein disclosed, the rotary wheel orienting means is associated directly with stem cavity peeling means disposed at a stem cavity peeling station. The present mechanism is designed efficiently to remove the peeling from the stem cavity of the whole peach, in reference to its suture plane and elongated shape. Experience has shown that in the majority of peaches the stem cavities are of elongated shape and not round, it therefore being important that the peeling operation be effected in predetermined reference to the suture plane of the stem cavity.

In the present instance the stem cavity peeler is disposed to operate upon the whole peach while the latter is held in the whole fruit turret, and is the first station of the mechanism operable upon the whole peach while in the holding jaws of this first turret. The mechanism for removing the stem cavity and peeling is shown in the drawings.

Referring particularly to Figure 1, mounted on the top of the frame 12 is a motor 216, which drives a belt 218 to pulley 220 on the shaft 222. This shaft, in addition carries a worm gear 224 driving another gear 226 (see Figure 18) on a vertical shaft 230. This shaft 230 is connected by means of a universal joint 232 to a telescopic shaft arrangement 234, which has pinned to the lower portion of the telescopic shaft arrangement a bevel gear 236. This telescopic shaft arrangement includes a driving key 238 of usual construction, and a spring 240 whereby to cause the bevel gear to be driven from the shaft 230 while permitting relative reciprocation of the movable portions of the telescopic shaft, and while at the same time permitting a swinging movement of the cutter mechanism driven by the bevel gear 236, as hereinafter set forth.

In addition to the telescopic shaft 234, there is provided a swinging frame arrangement adjacent thereto comprising a bracket 242 rigidly mounted upon a support portion 244 of the main frame. This bracket 242 includes an outstanding pin-like bearing 246, upon which a hub portion 248 of a mounting is adapted to oscillate. This hub portion 248 has a depending socket 250 having a depending shaft 252 affixed thereto as at 254. The bottom portion of this shaft 252 has slidably, adjustably affixed thereto a carriage 256 (see Figure 19). The upper portion of this carriage is provided with a smaller sleeve 258 carrying a pin 260, on which a pair of rollers 262 are mounted. The lower portion of the carriage carries a ring-like member 264 having a depending bracket 266, which, as shown in Figure 18, comprises arms 268 and 270 and a sleeve-like support 272 for the bottom portion of the telescopic shaft 234. The central arm 270 has a lower portion 276 forming at its bottom end a bearing 278 for the bottom portion of the telescopic shaft arrangement 234. Mounted in the arms 268 and 270 of this lower carriage is the shaft 280, to which is affixed a bevel gear 282 for driving the same from the bevel gear 236. Also mounted upon this shaft 280 between the arms 268 and 270 is the peeling cutter arrangement comprising stem cavity and suture plane orientation member 283, preferably formed as a wheel or disk, and having oppositely disposed hubs 284 which are loosely mounted upon the shaft 280. This wheel 283 is rotatably mounted so that it can roll on its shaft down into and out of the stem cavity, carrying with it a pair of rotating cutter blades 288 and 290. By thus mounting the disk 283, sawing or cutting of the fruit is prevented unless the stem indenture is in a predetermined position, and the character of the cutting operation is controlled in accordance with the position of the suture plane. Adjacent each hub 284 is a collar 285 and 286, which are keyed to the shaft 280 and form a support for the above mentioned cutter blades 288 and 290, which are of the general configurations shown in the drawings, and are attached to the collars 285 and 286 by means of the screws 292. It will be noted that the cutter members are staggered 180 degrees, so as to counterbalance the high speed rotation of the cutter shaft. Each cutter comprises generally concaved portions 294 on opposite sides of the wheel 283 as shown in Figure 22, and because of this opposite arrangement of these concaved portions of the cutters in combination with the wheel 283, which is adapted to roll in the suture plane axis of the central portion of the peach cavity, the cutters as they rotate will completely and precisely cut and sever the peel from the stem cavity.

Means is provided for oscillating the cutter about its swingable bearing pin 246, and, in association therewith, there is provided a cam mechanism to give the cutter a definite swinging movement. By reference to Figure 17 it will be seen that means is provided to place the stem cavity peeling cutters in position so as to partake of a swinging movement resiliently or yieldingly inwardly toward and into the stem cavity of the peach, and also a positive displacement movement away from the stem cavity of the peach and/or substantially up-and-down or vertical, reciprocatory movement longitudinally of the longer or suture plane axis of the stem cavity.

Referring particularly to Figure 2, mounted upon the whole fruit turret shaft 155 at the top thereof is a cam 300 which is pinned to shaft as at 302. This cam is provided with a camway 304 shown also in Figure 6. Slidably mounted transversely of the shaft 155 is a slide 306, which is slotted as at 308 to permit such movement of this slide. Such slide carries on its upper surface a roller 310 which operates in the cam slide 304, whereby upon rotation of the shaft 155, the slide is reciprocated in the manner shown in Figure 2. This slide at one end carries an operating arm 312 provided with a roller 314. This roller is adapted to contact a vertical plate-like member 316, which is mounted upon the pivoted member 250, which swings with the assembly. A depending arm 318 having a cam portion 319 formed on its lower end, is pivotally mounted at 320 on the rigid portion of the support 242, and it is provided with an inwardly extending shorter arm 322 adapted to be disposed between upper and lower screws 324 and 326, and by means of their adjustment are adapted to determine the position of the cam portion of the arm 318, whereby to determine the adjustment of the movement of the cutter as it approaches the peach stem cavity. Cam member 318 is adapted to contact one of the rollers 262 carried by the sleeve 256 on the swingable shaft 252 which in turn carries the cutters, whereby to prevent the cutters contacting the jaws 181, if no fruit be therebetween. The foregoing roller 314, in cooperation with the plate 316, positively forces the orientation wheel 283 and the cutters out of contact with the stem cavity so as not to interfere with the movement of the whole fruit turret and the whole fruit holding means. On the other hand, a coil spring 328 has one end attached as at 330 to a ring 332 pinned to the depending sleeve 256, and has its opposite end fixed to a pin 334 on an actuable arm 336 in turn fixed to an oscillatable shaft 338 hereinafter referred to, whereby the spring 328 constantly tends to draw the swingable stem cavity cutter and orientation wheel yieldingly toward the peach when the slide 312 and its roller 314 swings to the left, as viewed in Figure 17.

In addition to this movement, means hereinbefore referred to is provided for raising and lowering the orienting wheel and cutting mechanism in synchronized relation to the inward swinging movement of the parts toward the stem cavity. This is accomplished by the mechanism in Figures 17, 19, 20 and 21. By means of this arrangement, when the rod 252 is oscillated laterally by the roller 314 on the slide 312, and by means of the spring 328, the rod will shift the entire frame or support 266, which carries the wheel and cutter head, while at the same time the sleeve 256 carrying the parts may be shifted vertically with respect to the rod 252, due to the slot and block arrangement therebetween. The means for vertically raising and lowering the sleeve 256 carrying the cutter head and wheel 283 comprises the bar 336 hereinbefore described, which, when actuated, is adapted to raise and lower the sleeve 256 by means of contact with one of the rollers 262 thereon. The shaft 338 that actuates the bar 336, as shown in Figure 2, is provided at its opposite end with a roller 340, which is shifted by a cam 452 mounted on the shaft 136, as shown in Figure 21 of the drawings. Likewise, the sleeve 234 of the telescopic shaft arrangement will be raised and lowered vertically with respect to the sleeve 234, and it also will be retained in vertical alignment by the abutment 238 riding in the slot formed on the sleeve 234.

If desired, the means for giving the carriage 266 a vertical, reciprocatory movement, may be omitted, and merely the swinging movement may be imparted to the carriage. It is preferred, however, to give the combination of movements. It will be appreciated that, inasmuch as the elongated stem cavities of successive peaches vary in length and depth, the orientation wheel is provided to roll down through the cavity, allowing the opposed cutters to do the peeling, regardless of the length or depth, and in conformity with the shape of the stem cavity. The vertical movement and the swinging or oscillatory movement are independent of one another but in timed relation.

In accordance with the foregoing it will be seen that the spring 328 resiliently or yieldingly pulls the orientation wheel 283 and the peach relatively toward each other, while at the same time the wheel is given a vertical upward movement through the action of the power actuated arm 336, whereby the orienting wheel is caused to roll relatively along the convex surface of the peach and into and through the suture plane axis of the stem indent if and when the peach is in proper predetermined position.

The stem indenture of the peach in the direction of the suture plane axis merges smoothly and relatively flatly at each end with the convex surface of the peach, whereas in a direction transverse thereto the indenture is bordered by high shoulders merging relatively abruptly with the convex surface of the peach and dropping abruptly into the stem indenture. The curvature of the orienting wheel 283 is so predetermined that the wheel will roll into the stem indenture substantially to the bottom thereof when in registration with the suture plane axis of the indenture. However, if the whole peach is incorrectly positioned in the jaws 181 and 197 so that no stem indenture comes into registration with the orienting wheel no cutting action will occur; or alternatively if the peach is held so that other than the suture plane axis of the stem indenture comes into registration with the plane and path of movement of the orienting wheel the wheel will not enter the stem indenture to an appreciable extent and likewise no effective cutting action will occur.

Applicants have thus provided in the wheel 283, an orienting device which senses the position of the peach both with reference to its stem indent and its suture plane, and which orients and positions the peach and processing cutters 294 in respect to each other and in respect to the peach stem indent and suture plane so that a predetermined processing operation in respect thereto occurs. While the orienting wheel 283 has been specifically disclosed herein in connection with the control of the processing cutters 294 for peeling the stem indent, it is to be understood that a rotatable orienting wheel such as the wheel 283 which rolls relatively to the peach along its peripheral surface, and then into the peach stem indent and further becoming aligned with the suture plane axis thereof, may be variously used as an orientation member of sensing and/or control to effect the sensing and/or control of a peach and its processing mechanism relative to each other so as to effect the processing of the peach in a desired predetermined manner in respect to its stem indent and suture plane. A rotatable orienting wheel which rolls relatively circumferentially of the peach while the wheel and peach are yieldably radially urged toward each other, and which is shaped so as to enter the stem indent in one manner when in alignment with the suture plane, and in a distinguishably different manner when not in alignment with the suture plane, thus serves advantageously and effectively particularly as an orienting member for peaches and like fruit, wherein orientation of the suture plane as well as in respect to the stem indent is a factor of importance, as distinguished from the orientation of cherries and fruit of like character.

As the peach leaves the stem cavity peeling station, it is transferred by the whole peach conveyor to the cutting saw 376 which operates to sever the peach into substantially equal size half portions. It will be seen, particularly by reference to Fig. 12, that the orienting wheel, the saw and the whole peach conveyor are so constructed as to maintain the suture plane of the fruit in the same position relative to the plane of the orienting wheel 283 and the plane of the cutting saw 376, although the wheel and saw are in specifically different planes relative to each other. By this means it will be seen that those peaches which are properly positioned as engaged by the orienting wheel will be maintained in proper position by the conveyor between the orienting wheel and the cutting saw so that the latter effects the bisecting of such peaches substantially along the suture plane thereof, and longitudinally of the peeled stem indent.

After the severing of the peaches the peach halves are transferred from the whole fruit conveyor to the half fruit conveyor more particularly shown in Fig. 2, and subjected to further processing operations specifically forming no part of the present invention.

It is thought that the invention and numerous of its attendant advantages will be understood from the foregoing illustrative description and it is obvious that numerous changes may be made in the form, construction and arrangement of the several parts without departing from the spirit or scope of the invention or sacrificing any of its attendant advantages, the form herein described being a preferred embodiment for the purpose of illustrating the invention.

Having thus described our invention, what we claim as new and desire to secure by Letters Patent is:

1. In a device of the class described, the combination of means for supporting a whole fruit with the stem cavity exposed and with the longitudinal axis of the stem cavity extending in a predetermined direction, a support adapted to move toward and from said whole fruit, gauge means mounted on said support and having portions adapted to contact the stem cavity of the whole fruit when said support approaches said whole fruit, rotatable cutting means carried by said support and positioned by said gauge for cutting the peel of the stem cavity, and means for shifting said gauge transversely of its approaching and receding movements with respect to the stem cavity of the whole peach in a direction parallel to the longtudinal axis of the stem cavity.

2. In a device for treating whole peaches, the combination of means for holding stationary the whole peach with its stem cavity exposed, rotatable cutting means, means to rotate the cutting means, means for moving the cutting means to position the rotating cutting means in the stem cavity and means to cause the axis of the rotatable cutting means to move parallel to the longitudinal axis of the stem cavity as it rotates whereby to cut the peeling in the stem cavity from the peach.

3. In combination with cutting means adapted to cut a peach, means for supporting a whole peach so that its stem cavity may be exposed and so that the longitudinal axis of such stem cavity extends in a predetermined direction, a stem indent sensing member, means for causing said sensing member to move along the convexed periphery of the whole peach and into the stem cavity of the peach in a direction parallel to the longitudinal axis of the stem cavity, and means operatively connecting the sensing member and the cutting means and controlled by the cavity entering movement of said sensing member for controlling operation of the cutting means.

4. In a peach processing apparatus, the combination of peach cutting means, means for feeding a series of peaches toward the cutting means and for supporting each peach adjacent the cutting means, and shiftable mechanism operatively connected to the cutting means for controlling said cutting means and adapted to travel along the convex periphery of each held peach so fed for precluding the cutting of the peach except when the long axis of the stem indenture of the peach registers with the cutting means.

5. In a fruit processing machine, the combination of cutting means for cutting a series of peaches, stem cavity sensing means, means for relatively moving said peach and said sensing means into contact and to cause said sensing means to enter the cavity in a direction parallel to the long axis of the cavity, means responsive to said means entering the cavity of each of the successive peaches for controlling the action of the cutting means upon each of the successive peaches.

6. In a device for treating whole fruit, the combination of means for holding a whole fruit, a rotatable gauge mounted to roll into the stem cavity of the whole fruit while held by said holding means, and rotatable cutting means having a diameter no greater than the diameter of the gauge and mounted for movement with and operatively connected to said gauge to cut the peel of the whole fruit in the stem cavity during the rolling of the gauge into the stem cavity.

7. In a fruit handling machine, means for supporting a peach, a rotatable wheel of a thickness less than the dimension of the stem cavity of a whole peach measured in a direction transverse to the long axis of the cavity, said wheel being of a radius to penetrate into the stem cavity to maximum extent when aligned with the long axis of the stem cavity of the peach, means for shifting the peach supporting means and wheel relatively to cause the wheel to engage the surface of the whole peach carried by said supporting means and to penetrate into the stem cavity when aligned with the long axis of the stem cavity, a peach cutting mechanism operatively connected to said wheel and actuated in response to the entry of the wheel to maximum extent into the cavity of the peach to cut the peach engaged by the wheel.

8. In a fruit handling machine, means for supporting a whole peach, a rotatable wheel, means for positioning the wheel in contact with the surface of a whole peach carried by said supporting means, means for mounting said wheel for rotation in a predetermined plane, said wheel being shaped to enter to maximum extent into the stem cavity of the whole peach carried by said supporting means when the suture plane of the whole peach lies in the plane of rotation of the wheel, peach cutting means, and means operatively connecting the cutting means and the wheel, and responsive to the entry of the wheel to maximum extent into the stem cavity for controlling the action of the cutting means upon the peach.

9. In a fruit handling machine, means for supporting a whole peach with the stem cavity exposed, a rotatable wheel having a peripheral curvature corresponding generally to the curvature of the base of the stem cavity of peaches in the direction of the long axis of the stem cavity, said wheel being of a thickness to enter to maximum extent into the stem cavity when aligned with the long axis thereof, means for shifting the wheel relatively to a whole peach carried by said supporting means in a direction generally radially of a supported peach to cause the wheel to enter to maximum extent into the stem cavity of the whole peach when the long axis of the stem cavity is oriented in a predetermined direction, and cutting mechanism operatively connected to said wheel shifting means and responsive to the stem cavity entering movement of the wheel whereby to cut the whole peach when the long axis of the stem cavity is oriented in said predetermined direction.

10. In a fruit handling machine, means for supporting a whole peach, a generally wheel-shaped member having a peripheral edge which in cross section conforms generally to the cross sectional shape of the base of the stem indent of the whole peach in a plane generally perpendicular to the suture plane of the peach, means for rotating said wheel-shaped member, and means for positioning the rotating wheel-shaped member in contact with the surface of the whole peach carried by said supporting means and urging said wheel-shaped member to enter into the stem indent of the whole peach when the indent of the peach registers with the wheel-shaped member and the suture plane of the peach is aligned with the plane of the wheel-shaped member, and cutting means operatively connected to said wheel-shaped member and responsive to the indent entering movement of said member to effect a cutting of the peach.

11. A peach processing machine comprising means for holding a whole peach, an orientation sensing member shaped to enter to maximum extent the stem indent of a whole peach when aligned with the suture plane of the peach, means for positioning said sensing member in engagement with the whole peach carried by said holding means and urging said member into the stem indent of the peach to maximum extent when the suture plane of the peach is aligned with said member, a peach cutting member, and means operatively connected to said orientation member and said cutting member and responsive to the entry and non-entry of said sensing member to maximum extent into the stem indent of the peach for rendering said cutting member effective to cut the peach when the suture plane of the peach is aligned with the sensing member and ineffective to cut the peach when the suture plane of the peach is not in alignment with the sensing member.

12. In a machine for handling fruit having an elongated indent, a carrier, a plurality of fruit holders mounted on said carrier to securely hold the fruit therein, means for progressing said carrier over a path, means to position the stem indent of the fruit in each of said holders in a predetermined position, an indent sensing member positioned to move in contact with said fruit at said predetermined position, said indent sensing member having an elongated peripheral surface capable of penetrating said indent when the elongations of said indent and of said surface substantially coincide, means for moving said sensing member into contact with the fruit at said predetermined position and into the elongated indent of the fruit when the elongation of said indent and of said surface substantially coincide, cutting means for cutting a series of peaches, means responsive to said sensing member entering the indent of each of the successive fruits for controlling the action of the cutting means on each of the successive fruits.

RAYMOND L. EWALD.
HENRY A. SKOG.

References Cited in the file of this patent

UNITED STATES PATENTS

| Number | Name | Date |
|---|---|---|
| Re. 17,659 | Thompson | May 6, 1930 |
| 208,988 | Plummer | Oct. 15, 1878 |
| 284,823 | Cottrell | Sept. 11, 1883 |
| 331,451 | Scott | Dec. 1, 1885 |
| 943,249 | Jahansan | Dec. 14, 1909 |
| 1,263,742 | Chase | Apr. 23, 1918 |
| 1,312,332 | Kirino | Aug. 5, 1919 |
| 1,403,852 | Ensele | Jan. 17, 1922 |
| 1,448,472 | Thompson | Mar. 13, 1923 |
| 1,699,995 | Shields | Jan. 22, 1929 |
| 1,726,722 | Sleeper | Sept. 3, 1929 |
| 1,884,527 | Bem | Oct. 25, 1932 |
| 1,890,676 | Fox | Dec. 13, 1932 |
| 1,901,042 | Robbins | Mar. 14, 1933 |
| 2,139,704 | Thompson | Dec. 13, 1938 |
| 2,216,165 | Ewald et al. | Oct. 1, 1940 |
| 2,220,511 | Carroll | Nov. 5, 1940 |
| 2,232,208 | Carroll | Feb. 18, 1941 |
| 2,232,209 | Carroll | Feb. 18, 1941 |
| 2,254,594 | Carroll | Sept. 2, 1941 |
| 2,300,773 | Carroll | Nov. 3, 1942 |